US011011962B2

(12) United States Patent
Ko et al.

(10) Patent No.: US 11,011,962 B2
(45) Date of Patent: May 18, 2021

(54) DUAL-POLE ELECTROMAGNETICALLY-DRIVEN FOCUSING SYSTEM OF MICROMOTOR

(71) Applicant: YOVA TECHNOLOGY (HONG KONG) LIMITED, New Territories (HK)

(72) Inventors: Lin-Hsiang Ko, New Territories (HK); Xuyao Zhang, New Territories (HK); Chi-Lung Chang, New Territories (HK)

(73) Assignee: YOVA TECHNOLOGY (HONG KONG) LIMITED, Hong Kong (CN)

( * ) Notice: Subject to any disclaimer, the term of this patent is extended or adjusted under 35 U.S.C. 154(b) by 205 days.

(21) Appl. No.: 16/261,536

(22) Filed: Jan. 29, 2019

(65) Prior Publication Data

US 2020/0244148 A1 Jul. 30, 2020

(51) Int. Cl.
*G02B 7/04* (2021.01)
*H02K 11/215* (2016.01)
*H02K 41/035* (2006.01)

(52) U.S. Cl.
CPC ............. *H02K 11/215* (2016.01); *G02B 7/04* (2013.01); *H02K 41/0356* (2013.01); *H02K 2211/03* (2013.01)

(58) Field of Classification Search
CPC ........ G02B 6/3584; G02B 7/04; G02B 7/182; H02K 11/215; H02K 41/0356; H02K 2211/03
USPC ......................................................... 359/824
See application file for complete search history.

(56) References Cited

U.S. PATENT DOCUMENTS

| 10,567,563 | B2* | 2/2020 | Qian | H04M 1/0283 |
|---|---|---|---|---|
| 10,764,475 | B2* | 9/2020 | Hu | G02B 7/026 |
| 10,830,984 | B2* | 11/2020 | Sun | G02B 13/001 |
| 2014/0049848 | A1* | 2/2014 | Hsu | G02B 7/08 359/823 |
| 2015/0177479 | A1* | 6/2015 | Lee | H02K 41/0356 359/824 |
| 2018/0059356 | A1* | 3/2018 | Wu | G02B 7/04 |
| 2018/0224624 | A1* | 8/2018 | Ichihashi | H04N 5/2254 |
| 2018/0335601 | A1* | 11/2018 | Hu | G03B 3/10 |
| 2018/0338069 | A1* | 11/2018 | Hu | H04N 5/2252 |
| 2019/0107686 | A1* | 4/2019 | Sun | G02B 7/08 |

(Continued)

*Primary Examiner* — William R Alexander
(74) *Attorney, Agent, or Firm* — Leong C. Lei (57) ABSTRACT

A dual pole electromagnetically-driven focusing system of a micromotor includes a movable base having an elastic support system on upper and lower sides thereof and an outside configuration in a parallelepiped form having four side surfaces. Two loop coils are respectively fixed to two opposite side surfaces of the slidable base. Two dual-pole magnets are respectively arranged beside the two loop coils in a manner of being opposite to each other in respect of magnetism so that the two loop coils, upon energized, generate acting forces in opposite direction with respect to the two dual-pole magnets. A circuit device is arranged on one side surfaces of the movable base between the two loop coils. Three successive side surfaces of the movable base that are respectively provided with a combination of loop coil and dual-pole magnet, the circuit device, another combination of loop coil and dual-pole magnet, form a U-shaped structure.

6 Claims, 11 Drawing Sheets

(56) References Cited

U.S. PATENT DOCUMENTS

2019/0335029 A1* 10/2019 Qian .................... H04M 1/0283
2019/0339477 A1* 11/2019 Wu ....................... G02B 27/646

* cited by examiner

DUAL-POLE ELECTROMAGNETICALLY-DRIVEN FOCUSING SYSTEM OF MICROMOTOR

(a) TECHNICAL FIELD OF THE INVENTION

The present invention relates to a micromotor dual-pole electromagnetically-driven focusing system, and more particularly to equipment that is widely applicable to miniature photographing devices or usable with mobile phone camera systems to achieve the purposes of saving cost and reducing electromagnetic interference.

(b) DESCRIPTION OF THE PRIOR ART

With photographing device becoming small and lightweight, techniques concerning micromotors become even more significant. Particularly, mobile phones are almost a must for daily living and the demand for micromotors that are used in mobile phones has reached the peak. Thus, techniques for improving micromotors are being in increasing progress and development.

Using the micromotors in photographing devices is for the purpose that the motor can fast, accurately, and stably achieve the desired purpose of focusing, and also for use in shaking preventing devices. Known techniques often adopt an advanced closed-loop arrangement of micromotors, shown in FIG. 10, wherein a movable base 70 (shown in phantom lines in the drawing) is fit, on the outside thereof, with a coil 80 that has four major sides. One of the major surfaces of the coil 80 is provided with a flexible circuit board 90. The flexible circuit board 90 is provided with a detection element 91, which allows for mutual detection with respect to a sensing magnet 92 arranged at an inner side of the coil 80 in order to detect a focusing position of the movable base 70. Power is supplied from a driving magnet 81, 82, 83, 84 arranged at each of the four major surfaces of the coil 80. When the coil 80 is fed with an electrical current, interaction with the driving magnets 81, 82, 83, 84 on the four sides to generate a Lorentz force, which, in combination with the operation of the detection element 91 and the sensing magnet 92 provided on the circuit board 90, enables the movable base 70 to carry out precise movement control.

Figure 9:
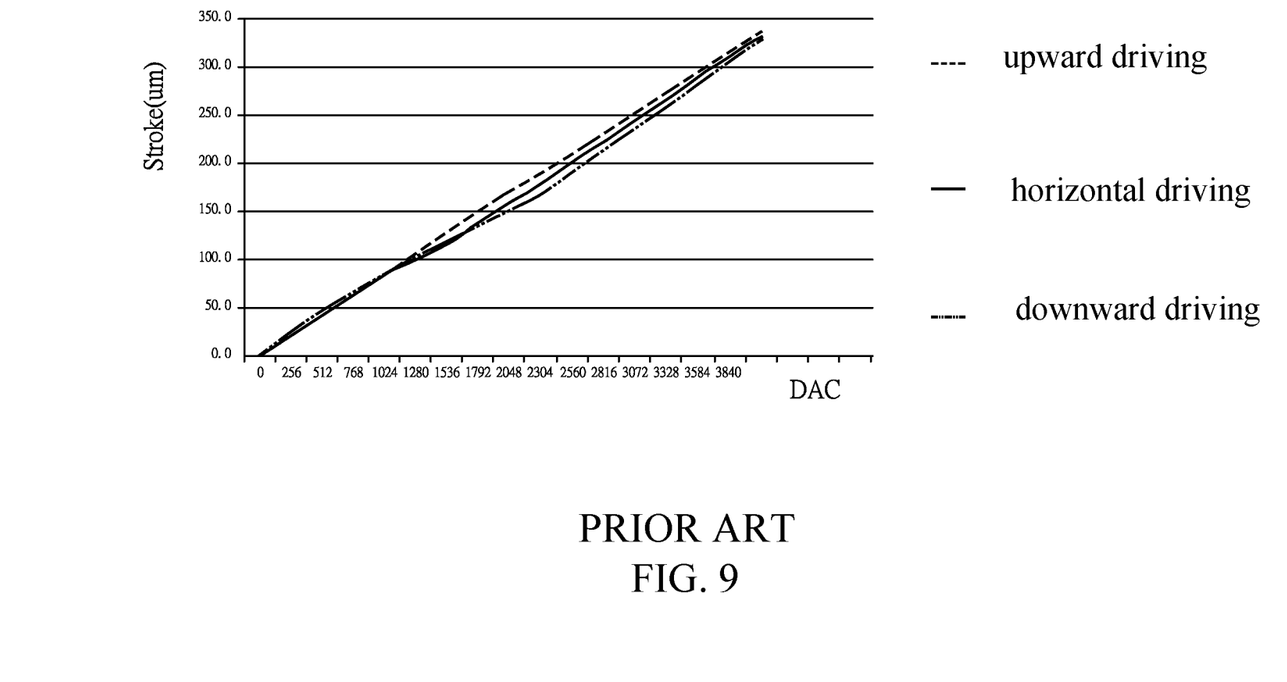
FIG. 9 is a plot illustrating an effect of interference on forward driving caused by magnetic attraction due to angular variation among components (such as a detection element, a sensing magnet, and a driving magnet) of an electromagnetically-driven focusing system.
Figure 10:
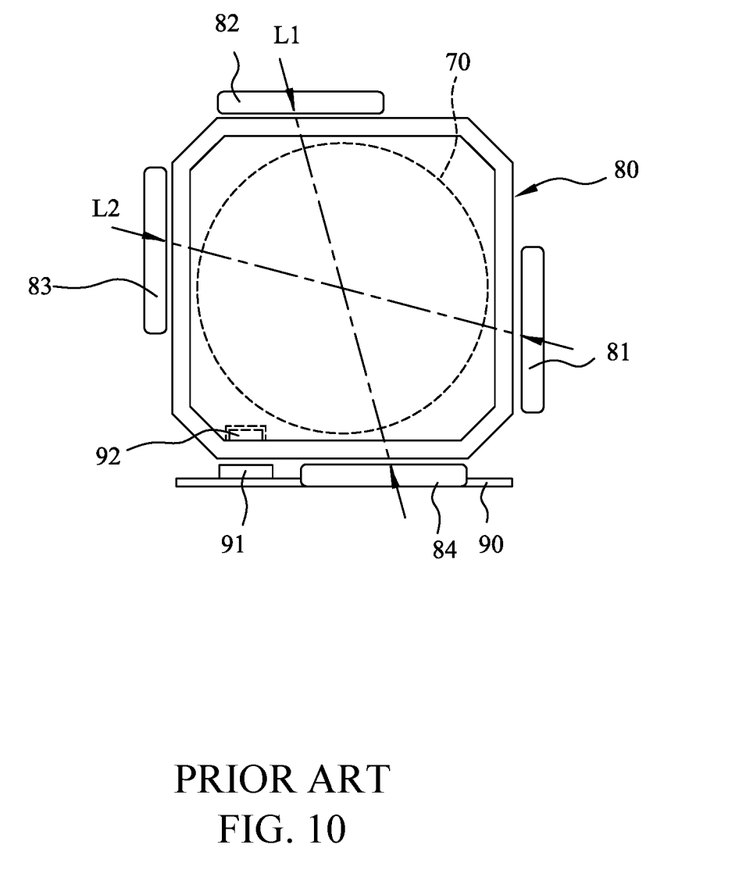
FIG. 10 is a schematic view showing a known structure.

However, for saving space, in such a structure, the positions where the detection element 91 and the sensing magnet 92 are assembled are provided at a corner of the coil 80 in order to collaboratively combine with the four driving magnets 81, 82, 83, 84 on the four sides to form a micromotor structure. Thus, the driving magnets 81, 82, 83, 84 around the coil 80 form an inclined symmetric arrangement and the four driving magnets 81, 82, 83, 84 may generate two sets of opposite magnetic forces to cause interference, such as the two magnetic force axis lines L1, L2 shown in the drawing. This also significantly affects the accuracy of the detection element 91 and the sensing magnet 92 (position detecting components), particularly variation of accuracy caused by change of posture. In the known electromagnetically-driven focusing systems, in using a camera or a mobile phone to take a picture, due to difference in respect of elevation angle, horizon, down angle of the camera lens (motor), related components, such as a linear motor illustrated in FIG. 9, to show displacement or stroke varying linearly with a digital-to-analog converter (DAC) of an electrical current flowing through the coil. FIG. 9 shows, for horizontal forward driving, a solid line is of a normal ratio, while when the camera lens (motor) is operated with an elevation angle or down angle, as shown in the upward driving and downward driving of FIG. 9, irregular variation occurs in the curves. One reason that is commonly seen is that the detection element 91, the sensing magnet 92, and the driving magnet 81, 82, 83, 84 that are shown in FIG. 10 may cause, due to magnetic attraction, interference with the driving of the slidable base 70, so that deviation occurs in upward driving, horizontal driving, and downward driving. Thus, the accuracy of transmission is deteriorated and focusing and shake prevent of a mobile phone may become unstable. This is the major drawback of the known techniques.

Considering the current technical level of the industry, where, as shown in FIG. 10, the slidable base 70 that carries the camera lens being of a cylindrical structure and the coil 80 being a frame having four major sides are almost invariant. The challenge of the industry to minimize the size but still maintain the accuracy of measurement at a predetermined level can only be achieved through ingenious and delicate arrangements.

In addition, the known techniques require four sensing magnets. In addition to interferences that they may cause with other components, they also create additional burden of weight. This is also an issue to be resolved.

SUMMARY OF THE INVENTION

The primary objective of the present invention is to eliminate an arrangement that requires two sets of driving magnet so as to avoid mutual interference therebetween and also to avoid interference among the driving magnet and the detection element and the sensing magnet due to being closely located. As such, additional consideration may be taken in order to overcome such issues.

Another objective of the present invention is to eliminate the use of two sets of driving magnet, and, instead, using just on set of driving magnet but reducing the issue of electromagnetic interference due to ingenious and delicate position arrangement, so that even though one set of magnet is removed for reducing the weight, the force for driving the slidable base is not reduced, and accuracy of detection is improved.

Thus, the dual-pole magnets and coils can be set distant from the sensing magnet and the detection element that are provided for control of positioning so as to minimize the noise interference generated during detection to thereby effectively reduce signal variation caused by posture difference (facing upward or facing downward) to make focusing and detection for shake prevention more accurate and the weight reduced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 5:
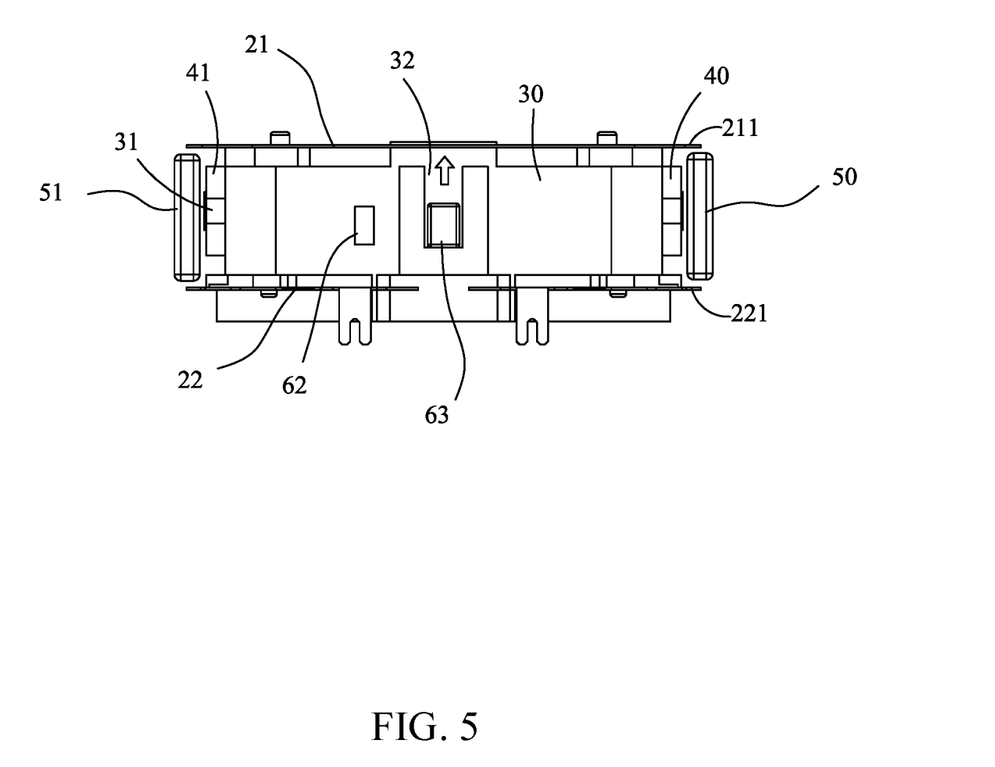
FIG. 5 is a front view showing an operation of the present invention.
Figure 6:
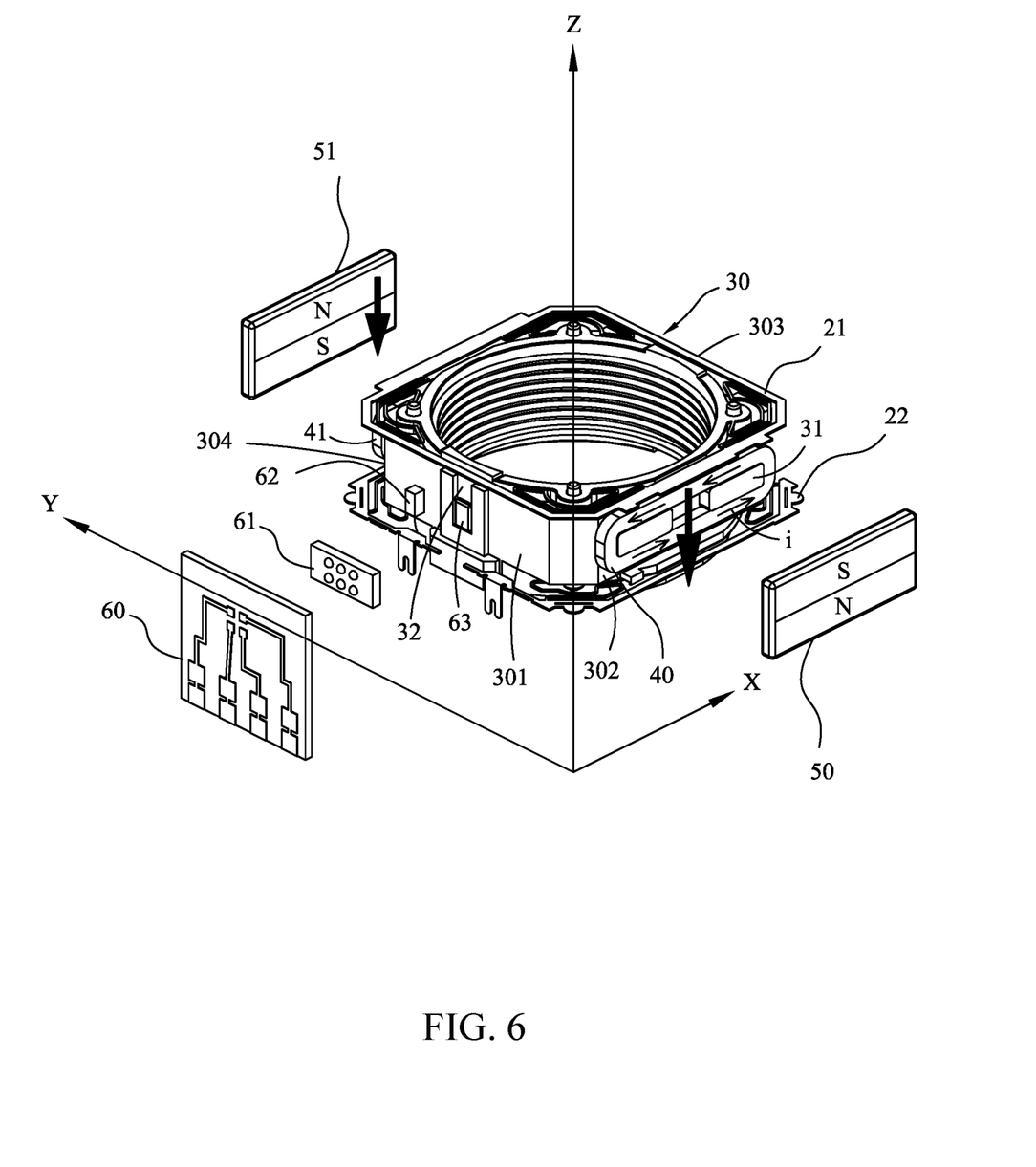
FIG. 6 is a perspective view showing an operation of the present invention.

Referring to FIGS. 2, 3, 4, and 5, a movable base 30 is formed with a cylindrical hollow passage 300 in a central portion thereof and is formed as a cube or a rectangular parallelepiped in an outside configuration thereof to show four side surfaces 301, 302, 303, 304, among which one pair of opposite side surfaces 302, 304 are formed with a group of insertion sections 31 and one side surface 301 that is located between the two side surfaces 302, 304 that have the insertion sections 31 is provided with a slide channel 32 extending in parallel with the cylindrical hollow passage 300 (namely in the direction of Z-axis shown in FIG. 6). The movable base 30 is connectable with a camera lens (not shown) at an outer end of the cylindrical hollow passage 300.

Figure 2:
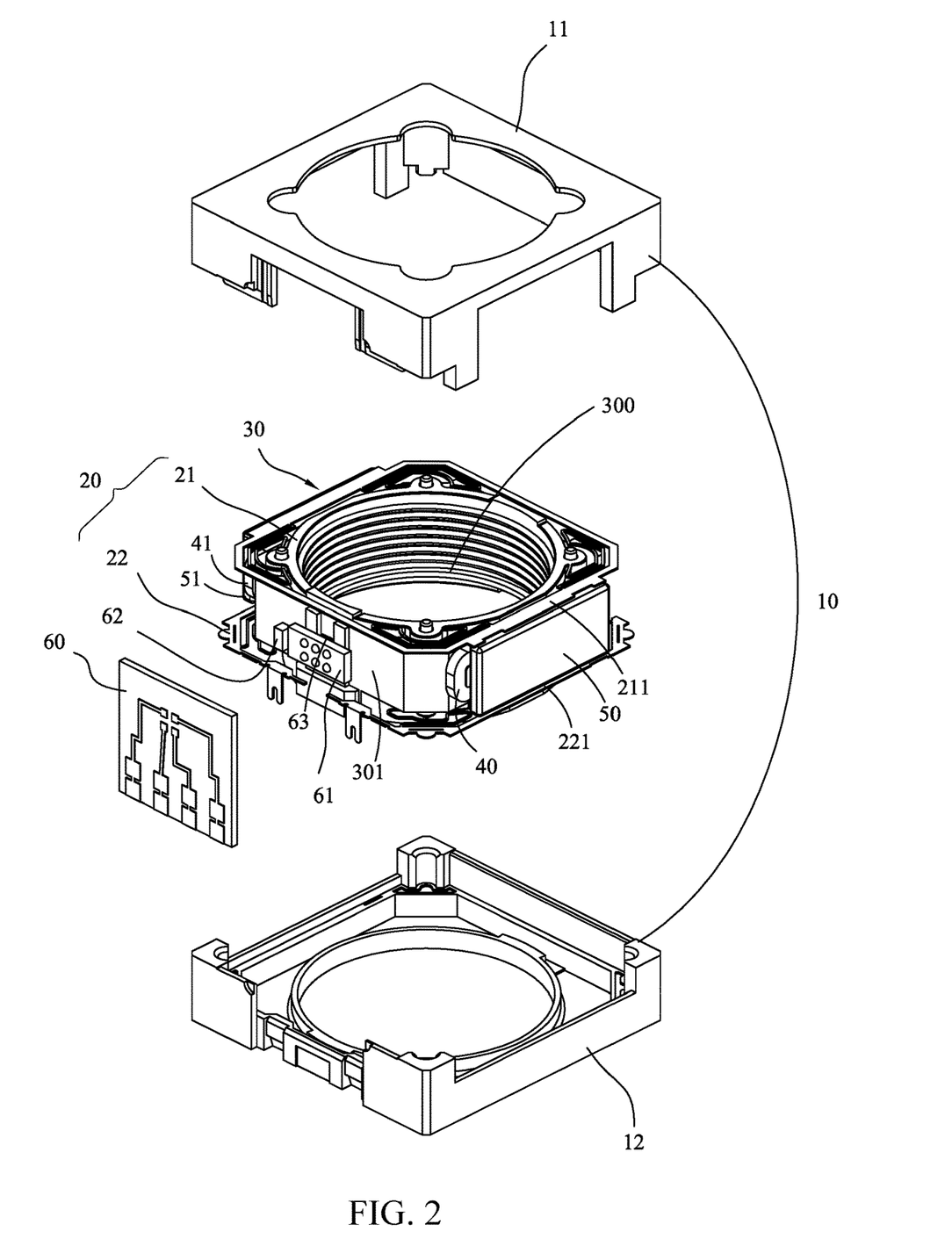
FIG. 2 is an exploded view of the present invention showing a housing being detached.
Figure 3:
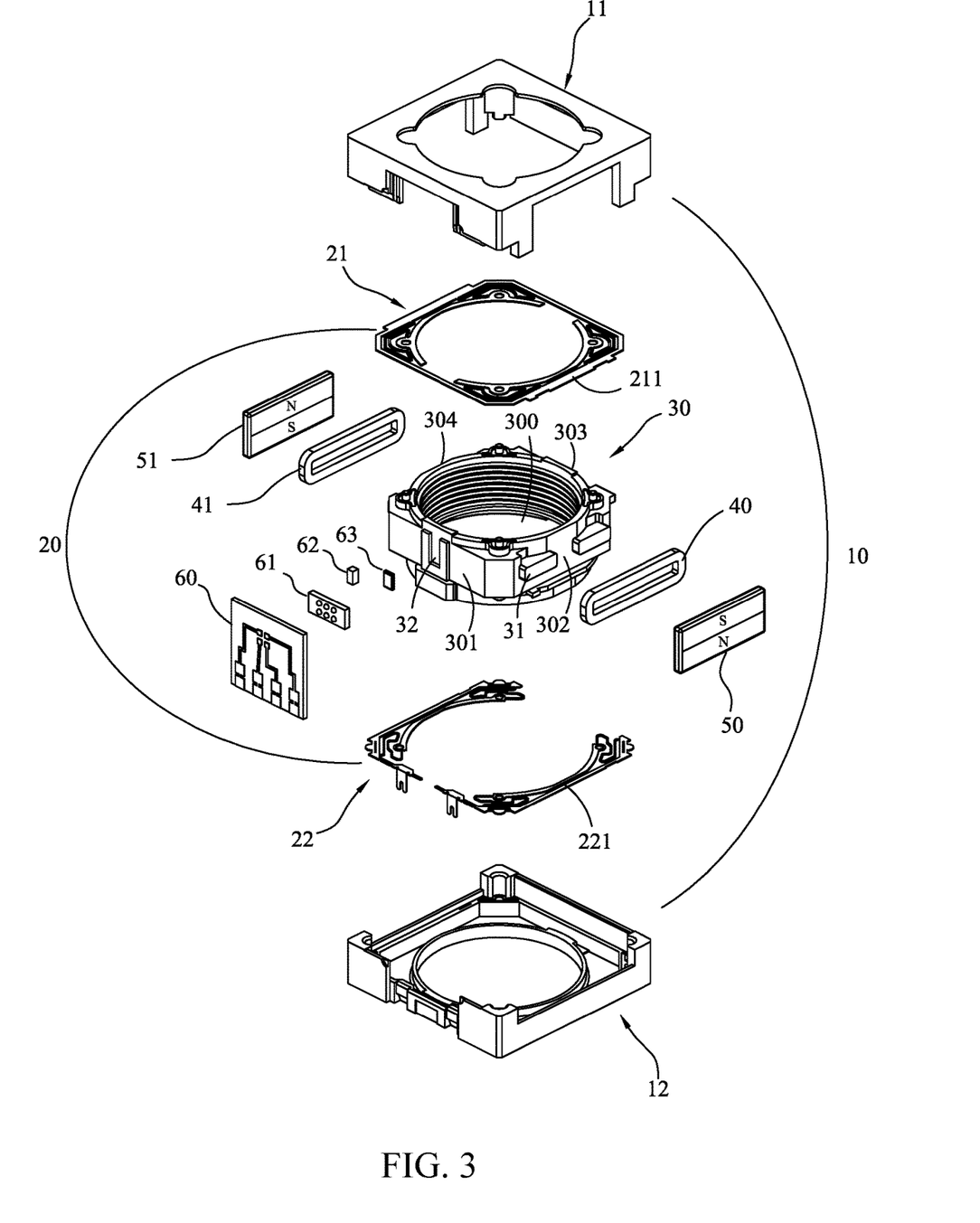
FIG. 3 is an exploded view, in a more detailed form, showing the present invention.
Figure 4:
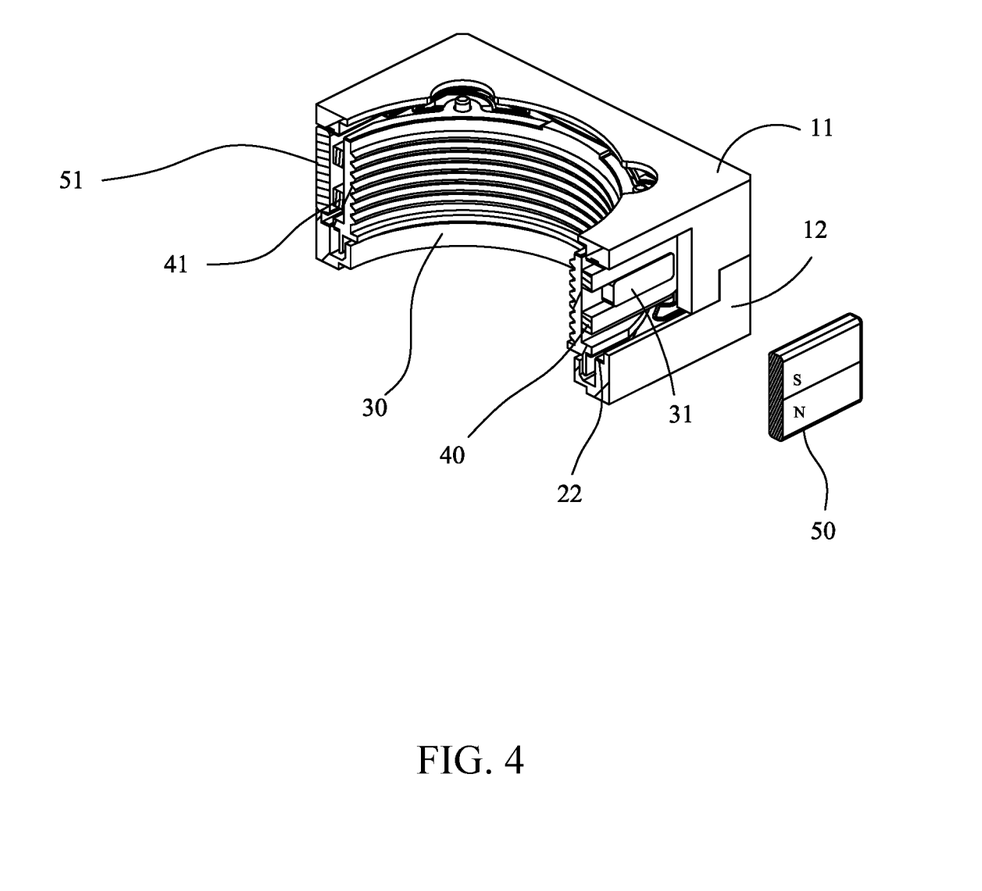
FIG. 4 is a perspective view, being partly cut away in a longitudinal direction, showing the present invention.

As shown in FIGS. 2, 3, and 5, an elastic support system 20 comprises an upper spring plate 21 and a lower spring plate 22, which are respectively coupled to two ends of the movable base 30 on the upper and lower sides to provide a cushioning effect to the movable base 30.

Referring to FIGS. 2, 3, 4, and 5, two loop coils 40, 41 are respectively disposed on the two side surfaces 302, 304 of the outside configuration of the slidable base 30 that are formed with the insertion sections 31 and the two loop coils 40, 41 are fixed by the insertion sections 31 that are fit therein.

Two dual-pole magnets 50, 51 are structured to correspond, in size, to the two loop coils 40, 41 and are arranged on outer sides of the two loop coils 40, 41 of the slidable base 30 in a manner of having magnetic polarities oppositely arranged (such as having N polarities and S polarities arranged in alternate directions) so that the two loop coils 40, 41, upon energized, generate opposite acting forces with respect to the two dual-pole magnets 50, 51, wherein to have the two dual-pole magnets 50, 51 securely fixed on the outer sides of the two loop coils 40, 41, in a preferred embodiment, the upper spring plate 21 and the lower spring plate 22 of the elastic support system 20 are respectively formed, on an outer edge thereof, with coupling tabs 211, 221 such that the coupling tabs 211, 221 protrude beyond edges of the upper and lower ends of the slidable base 30 (see FIG. 2) to achieve, in combination retaining achieved with the frame 11 and the chassis 12, such secure fixing.

Figure 1:
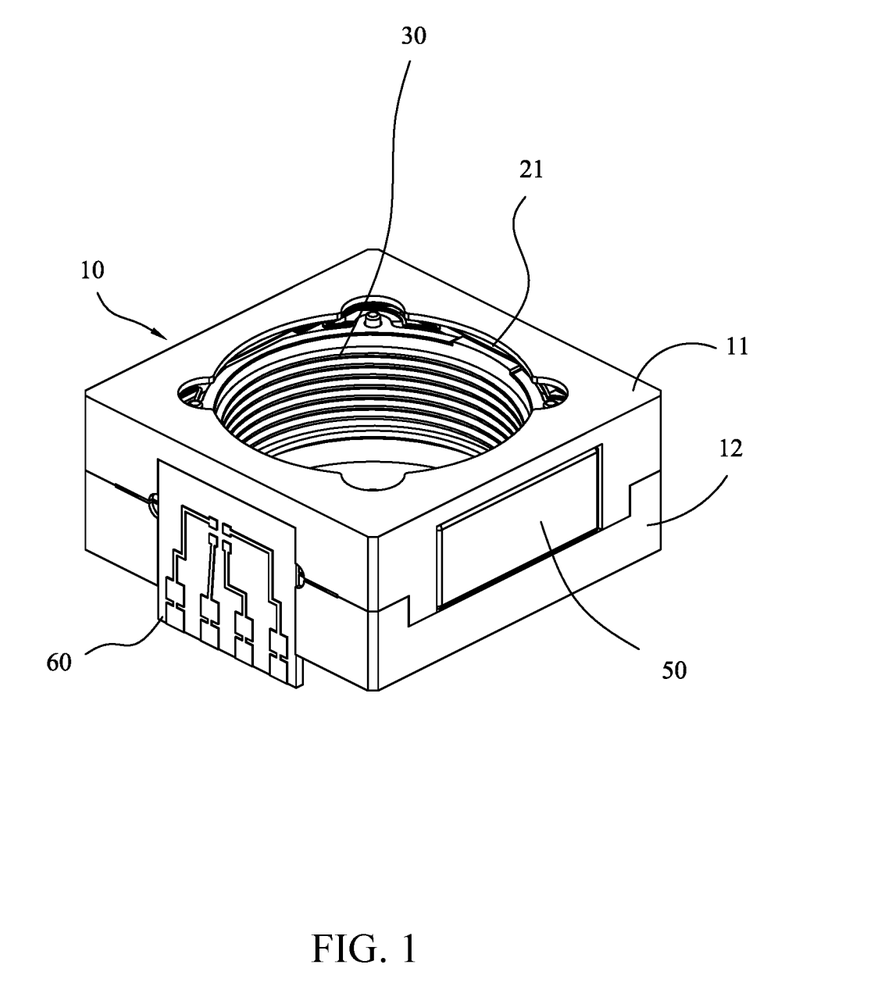
FIG. 1 is a perspective showing the present invention mounted to a micromotor.

Referring to FIGS. 1, 2, and 3, a circuit device 60 comprises a circuit arrangement for control of a micromotor and is arranged at a location opposing the one side surface 301 that is located between the two loop coils 40, 41 of the movable base 30. The circuit device 60 has an inside surface that is provided with detection elements 61, 62, and a sensing magnet 63 corresponding to the detection element 61 is disposed in the slide channel 32 of the movable base 30. The circuit device 60 (see FIG. 1) is inserted or received between the frame 11 and the chassis 12. The circuit device 60 has an outside surface that is provided with a plurality of contact terminals connectable with power and signal signals wires.

Figure 7:
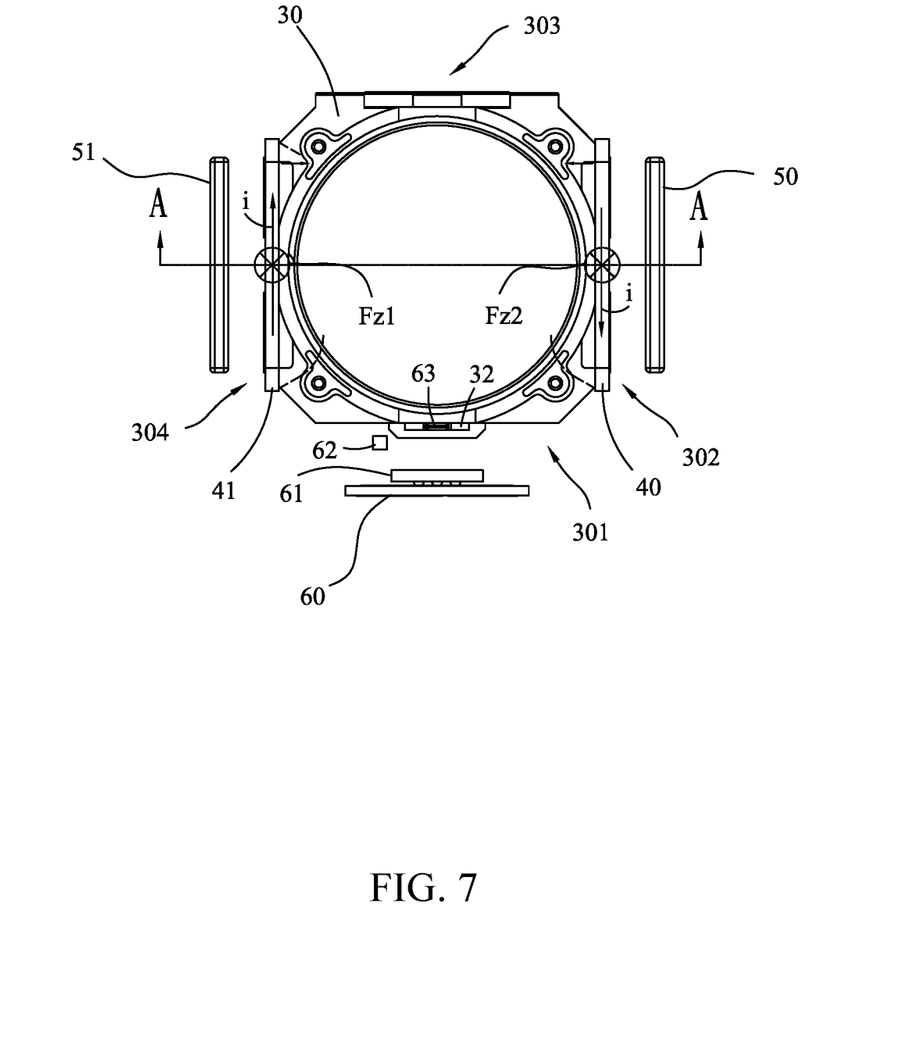
FIG. 7 is a top plan view of the present invention.

Among the four side surfaces 301, 302, 303, 304 of the outside parallelepiped configuration of the movable base 30, three side surfaces 302, 301, 304, which are adjacent to each other as being successively arranged, are respectively disposed with a combination of one of the loop coils 40 and a corresponding one of the dual-pole magnets 50, a system of the circuit device 60, and a combination of an opposite one of the loop coils 41 and a corresponding one of the dual-pole magnets 51, so as to form a U-shaped structure (see FIG. 7).

Figure 7A:
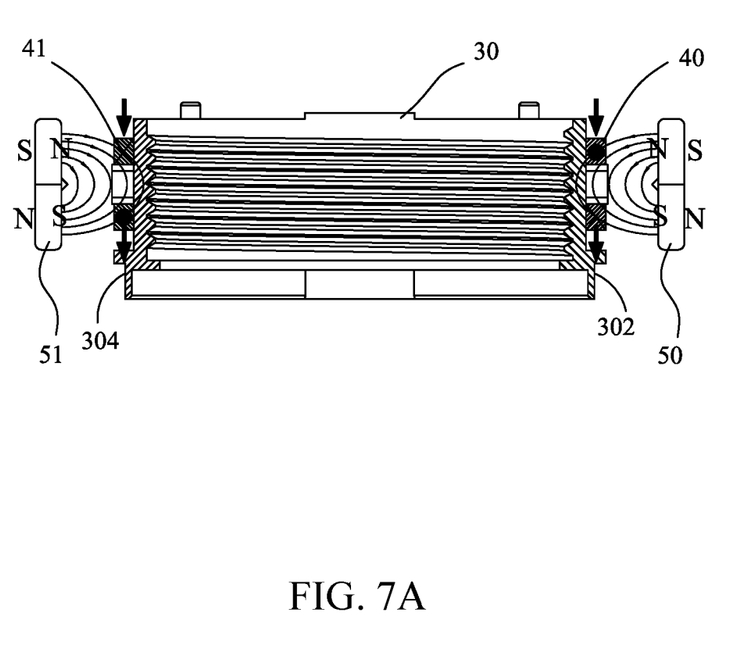
FIG. 7A is a cross-sectional view taken along line A-A of FIG. 7.

Referring to FIGS. 6, 7, and 7A, the major features of the present invention are that two sets of dual-pole magnet 50, 51 and coil 40, 41 are provided on two opposite side surfaces 302, 304 of the movable base 30 to be opposite to and corresponding to each other and the circuit device 60 and the detection elements 61, 62 are arranged at a location in front of and opposing the side surface 301, while the sensing magnet 63 is attached to the side surface 301 as being received in the slide channel 32, wherein with the two coils 40, 41 being in the magnetic fields established by the two dual-pole magnets 50, 51, when an electrical current i is fed to the coils 40, 41, according to Lorentz law, magnetic forces Fz1, Fz7 that are perpendicular to the dual-pole magnets 50, 51 are generated, wherein the two magnetic forces Fz1, Fz7 are identical (namely Fz1=Fz7). Thus, when the electrical current i fed through the coils 40, 41 varies, the sensing magnet 63 is caused to move along the Z-axis (as shown in FIGS. 5, 6), and at the same time, the detection elements 61, 62 could make precise detection of an amount of movement of the movable base 30 in order to carry out an optical measurement operation, such as focusing. In this arrangement, the dual-pole magnets 50, 51 and the coils 40, 41 that are arranged for the purposes of focusing are all distant from the circuit device 60, the detection elements 61, 62, and the sensing magnet 63 that are provided as position detection components, and also, since the dual-pole magnets 50, 51 could provide an enlarged output of force, it is possible to eliminate or omit the use of a magnetism conducting yoke, so that the unique structural arrangement of this invention could minimize noise interference of the detection module, while effectively reducing signal variation caused by posture difference in making photographing.

The present. Invention offers unique advantages in application to a dual-lens camera device, wherein primarily, two such structures of the present invention described above are collectively disposed in one dual-lens camera device in a manner demonstrated in FIG. 8. The two structures according to the present invention are each such that among the four side surfaces 301, 302, 303, 304 of the outside parallelepiped configuration of the movable base 30, three side surfaces 302, 301, 304, which are adjacent to each other as being successively arranged, are respectively disposed with a combination of one of the loop coils 40 and a corresponding one of the dual-pole magnets 50, a system of the circuit device 60, and a combination of an opposite one of the loop coils 41 and a corresponding one of the dual-pole magnets 51, so as to form a U-shaped structure (see FIG. 7), which will be taken as a unit structure in this invention. The two U-shaped structures are arranged side by side to form an elongated body and the circuit devices 60 of the two structures are located at two outermost ends to be opposite to each other and the component assemblies that include the coils 40, 41 and the dual-pole magnets 50, 500 are arranged, in a pairwise manner, at the two opposite side surfaces 302, 304 of the movable base 30.

The ingenious and delicate structural arrangement according to the present invention provides the following advantages:

(1) The present invention is structured such that among the four side surfaces of the outside parallelepiped configuration of the movable base, three side surfaces, which are successively arranged, are respectively disposed with a combination of loop coil and dual-pole magnet, a circuit device system, and another combination of loop coil and dual-pole magnet so as to form a U-shaped structure as a unit structure, wherein in such a structural arrangement, the dual-pole magnets are distant from the sensing magnet and the detection elements that are provided to control positioning, so that noise interference generated during detection could be minimized thereby effectively reducing signal variation caused by posture difference (such as facing upward or facing downward) to thus make focusing and shake-prevention detection more accurate. This is the major advantage of the present invention.

Figure 8:
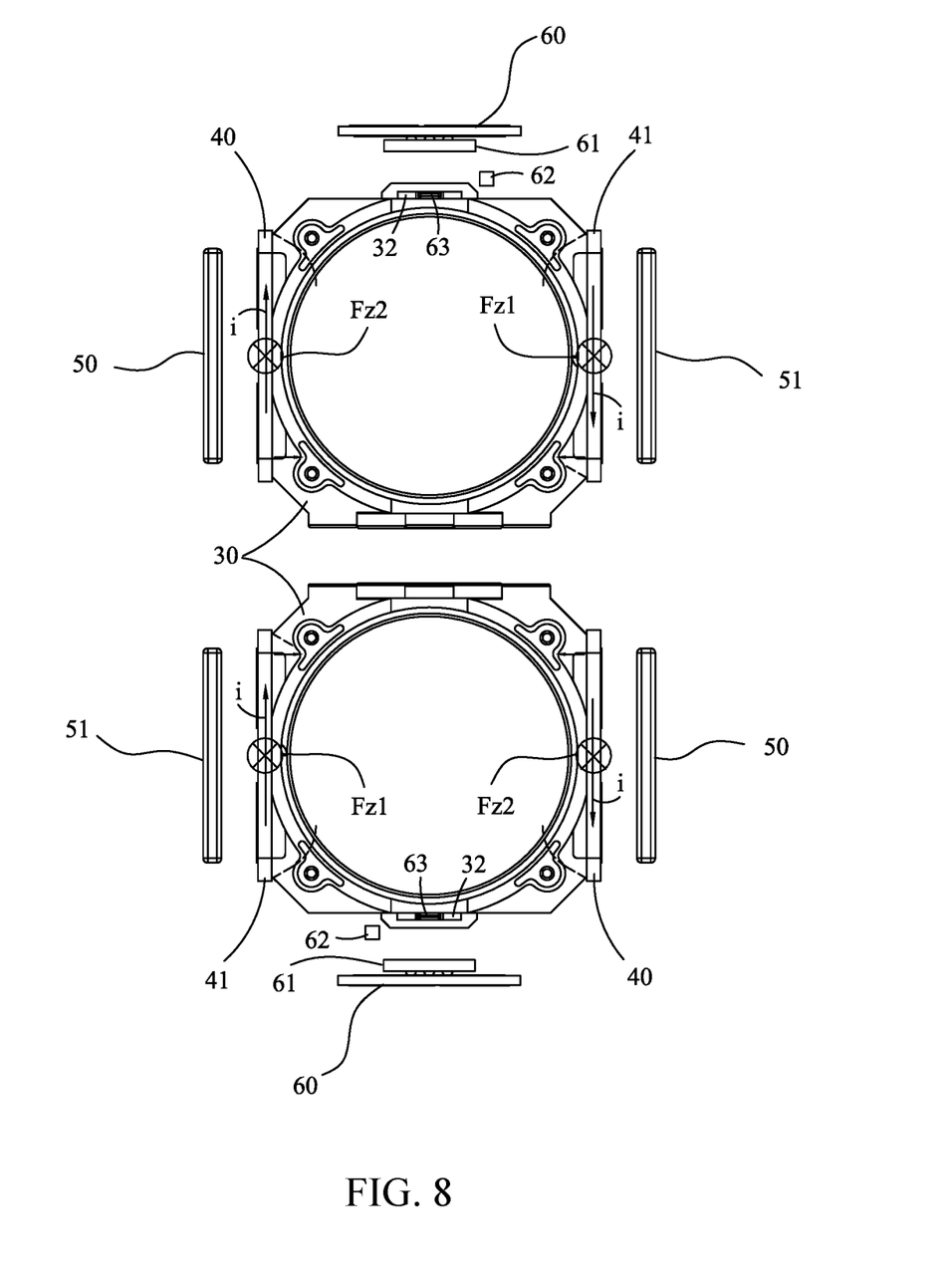
FIG. 8 is a schematic view illustrating an arrangement of U-shaped structures of the present invention in a dual-lens application.

(2) In an application of the present invention to a dual-lens camera device, two systems of U-shaped structure are used. Two motors, although being used collectively, can be set at an extremely short distance with each other, due to the structural arrangement of the U-shaped structures, and the two circuit devices are still far apart so that there is no magnetic attraction or magnetic repulsion (wherein the arrangement of positioning is shown in FIG. 8). This is also an advantage of the U-shaped structure of the present invention.

(3) Compared to the known structure, in addition to weight reduction achieved with omission of two single-pole magnets, it is also possible for this invention to further omit any magnetism conducting yoke so as to make the size even smaller and lighter in weight. Further, the dual-pole magnet could provide a driving force that is better than that of a single-pole magnet, so that no delaying caused by reduction in the number of magnets may be experienced in driving the slidable base and sufficient driving force is still provided, while the cost can be reduced. This is another advantage of this invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A micromotor dual-pole electromagnetically-driven focusing system, which is mountable between a frame and a chassis of a micromotor housing, at least comprising:
  a movable base, which has a central portion formed with a cylindrical hollow passage and an outside configuration in a parallelepiped form having four side surfaces, of which one side surface is formed with a slide channel that extends in parallel with the cylindrical hollow passage;
  an elastic support system, which comprises an upper spring plate and a lower spring plate, which are respectively coupled to two ends of the movable base on upper and lower sides to provide a cushioning effect to the movable base;
  two loop coils, which are respectively fixed to two opposite ones of the side surfaces that are not formed with the slide channel;
  two dual-pole magnets, which are arranged, in a manner of being opposite to each other in respect of magnetism, at one side of two loop coils so that the two loop coils are energizeable to generate acting force with respect to the two dual-pole magnets; and
  a circuit device, which comprises a circuit arrangement for control of a micromotor and is arranged on one of the side surfaces that is located between the two loop coils of the movable base, the circuit device having an inside surface that is provided with a detection element, wherein a sensing magnet that corresponds to the detection element is received and disposed in the slide channel of the movable base;
  wherein among the side surfaces of the outside parallelepiped configuration of the movable base, three side surfaces that are successively arranged are respectively disposed with a first combination of a first one of the loop coils and a corresponding one of the dual-pole magnets, the circuit device, and a second combination of a second one of the loop coils and a corresponding one of the dual-pole magnets, so as to form a U-shaped structure; and
  wherein the upper spring plate and the lower spring plate of the elastic support system are respectively formed with coupling tabs protruding outside the upper and lower ends of the slidable base to securely fix, in combination with retaining achieved with the frame and the chassis, the two dual-pole magnets in position.

2. The micromotor dual-pole electromagnetically-driven focusing system according to claim 1, wherein the circuit device is received between the frame and the chassis and the circuit device has an outside surface that is provided with a plurality of contact terminals connectable to power and signal lines.

3. The micromotor dual-pole electromagnetically-driven focusing system according to claim 1, wherein the movable base is formed with a group of insertion sections protruding therefrom at locations corresponding to a center of each of the two loop coils for fitting into and fixing the loop coils in position.

4. The micromotor dual-pole electromagnetically-driven focusing system according to claim 1, wherein the movable base is connectable to a camera lens at an outer end of the cylindrical hollow passage.

5. The micromotor dual-pole electromagnetically-driven focusing system according to claim 1, wherein the two dual-pole magnets are respectively arranged at outer sides of the two coils.

6. A micromotor dual-pole electromagnetically-driven focusing system, which is adapted to mount in a dual-lens camera device, comprising a frame and a chassis of a micromotor housing and being provided with two systems, each of the two systems at least comprising:
- a movable base, which has a central portion formed with a cylindrical hollow passage and an outside configuration in a parallelepiped form having four side surfaces, of which one side surface is formed with a slide channel that extends in parallel with the cylindrical hollow passage;
- an elastic support system, which comprises an upper spring plate and a lower spring plate, which are respectively coupled to two ends of the movable base on upper and lower sides to provide a cushioning effect to the movable base;
- two loop coils, which are respectively fixed to two opposite ones of the side surfaces that are not formed with the slide channel;
- two dual-pole magnets, which are arranged, in a manner of being opposite to each other in respect of magnetism, at one side of two loop coils so that the two loop coils are energizeable to generate acting force with respect to the two dual-pole magnets; and
- a circuit device, which comprises a circuit arrangement for control of a micromotor and is arranged on one of the side surfaces that is located between the two loop coils of the movable base, the circuit device having an inside surface that is provided with a detection element, wherein a sensing magnet that corresponds to the detection element is received and disposed in the slide channel of the movable base;

wherein among the side surfaces of the outside parallelepiped configuration of the movable base, three side surfaces that are successively arranged are respectively disposed with a first combination of a first one of the loop coils and a corresponding one of the dual-pole magnets, the circuit device, and a second combination of a second one of the loop coils and a corresponding one of the dual-pole magnets, so as to form a U-shaped structure; and wherein the U-shaped structures of the two systems are arranged side by side to form an elongate body, the two circuit devices being arranged at outermost ends of the elongate body to be opposite to each other, component assemblies that include the coils and the dual-pole magnets being arranged, in a pairwise manner, at two opposite sides of the movable base.

* * * * *